Figure 1:
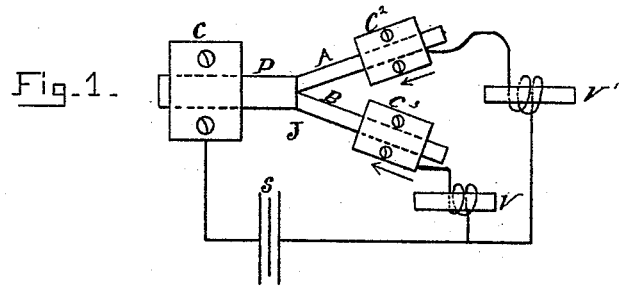

(No Model.)

E. THOMSON.
METHOD OF ELECTRIC WELDING.

No. 487,302. Patented Dec. 6, 1892.

WITNESSES—
S. B. Thompson.
John W. Gibboney

INVENTOR—
Elihu Thomson

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 487,302, dated December 6, 1892.

Application filed October 2, 1890. Serial No. 366,901. (No model.)

*To all whom it may concern:*

Be it known that I, ELIHU THOMSON, a citizen of the United States, and a resident of Swampscott, in the county of Essex and Commonwealth of Massachusetts, have invented a new and useful Improvement in Methods of Electric Welding, of which the following is a specification.

My present invention relates to extensions of the application of the method of electric welding disclosed in my patent, Serial No. 347,140, filed March 29, 1886, which consists, substantially, in the abutting of two pieces of metal together and the passage of an electric current across the junction of a power sufficient to soften, fuse, or unite the pieces while they are subjected to pressure to effect their union.

In describing my present invention I shall use merely symbols so far as the clamping and holding devices are concerned, as well as the source of current, it being understood that where I indicate a source of current it is to be of large volume and low electro-motive force and that the cables or other connections for conveying it to the work are made, in accordance with the requirements, to have little or no resistance. It will be understood, also, that where I speak of a clamp being made movable toward another it may be provided with the usual guides and propelling devices for moving the clamp by pressure, such as are now a part of the art of electric welding and well understood without further illustration. The source of current which I employ may of course be of various kinds. It may be alternating, continuous, or of any other description, interrupting or broken, and it may fluctuate, if desired, the only requirement being that it shall be sufficient to heat the metal pieces at the joint, so that they may be united when pressed together. In the figures accompanying this specification, therefore, the details of clamping, cables for conveying the current, and their connection are left out.

The present invention consists in uniting pieces in such a manner that a greater current passes through one piece than through another or others concerned in the operation, whereby if the one piece be larger than the other it may reach the welding temperature at the same time with the other or others.

My improvement consists, also, in so arranging the parts to be united that each piece shall receive a current depending on its conductivity, so as to raise it to the welding temperature at the same time as the other or others.

My present improvement also relates to the production of joints at angles between pieces of metal; and it consists in clamping the pieces together at an angle, at the same time passing a current through the pieces until they are sufficiently softened, and then pressing the pieces together to unite them while maintaining them at the angle at which they were clamped; and my invention further relates to the method of making joints between pieces of metal, angle-joints or otherwise, which consists in placing the pieces together at the desired angle in suitable clamps and passing the current through each of the pieces until sufficiently softened and proportioning the strength of the current to the conductivity of the pieces and pressing the pieces together, so as to unite them at the angle desired.

Figure 2:
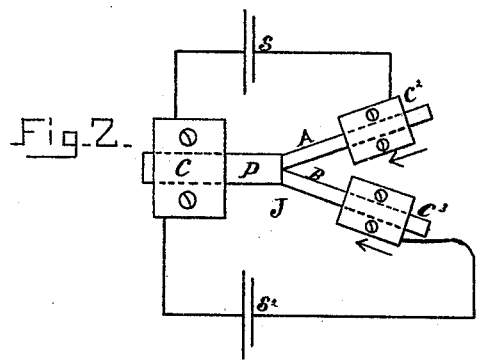
Figure 3:
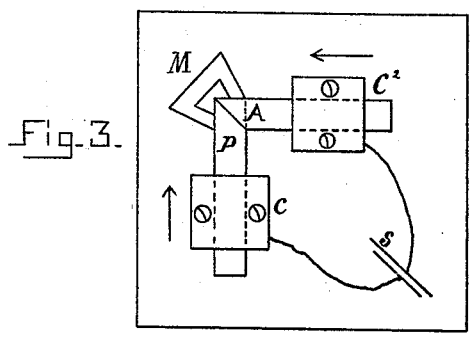
Figure 4:
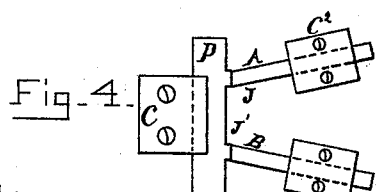

Figure 1 shows one of the ways of carrying one of the operations of my invention into practice. Fig. 2 is a modification of the same. Fig. 3 shows my invention arranged for welding at angles. Fig. 4 shows one of the applications of the principles of my invention into practice.

It will be understood, however, that my invention is applicable to many other forms and dispositions than those shown in the figures, these being merely introduced to show the principles involved.

In Fig. 1 it is shown that my invention is being applied to the joining of pieces of metal, such as a piece P and a piece of smaller diameter A to another piece of small diameter B. The piece P would be held in the ordinary heavy contact-clamp C and the pieces A and B also be held in suitable clamps $C^2$ and $C^3$. Either the clamp C may be made itself movable toward the others or the clamps $C^2$ $C^3$ may be made movable either together or independently. A source of electric current of great volume but low electro-motive force is connected by heavy conductors, symbolized as seen in the figure, the source being S, which may be alternating, continuous, or otherwise, one terminal being connected to the clamp C or to the piece P where clamped and the other terminal being divided and attached to the clamps C² C³, respectively. In some cases nothing more than this is required before the passage of the current. The current passing heats the pieces where they meet at the joint J, and since the large piece P has the added currents passing through A and B passing through it it has a heating effect greater in proportion, so that instead of remaining comparatively cool it increases in temperature along with the increase of the smaller pieces, which carry less current. The positions of clamping or distances from the joint are selected in order to make the resistance of the branches, and consequently the current passing through the branches, proportional to the heating to be done or to the size of the pieces. In some cases a variable resistance or, where alternating currents are used, a variable reaction may be introduced into each branch of the source of current, as V V', or, as is evident to a skilled electrician, these devices might be replaced with continuous currents by counter-electro-motive-force generators or assisting-electro-motive-force generators, as the case may be, for adding to or subtracting from the voltage passing to the respective pieces A B. It is not essential, in fact, that the three pieces P A B be welded during the operation, as it will be sufficient to have the pieces in place and pressed together, only two of them—say P and A—removing B at any time or not pressing it so as to cause it to weld. The function, then, of the three pieces is only for the purpose of carrying current and assisting the heating of the larger piece P.

In Fig. 2 the arrangement may be made the same as in Fig. 1, with the exception that two sources of current S S² may be employed, one to connect to clamp C by one terminal, while the other terminal is connected to C², and the other source of current be connected to clamp C by one terminal and its other terminal to clamp C³. The clamps may be made movable or fixed, as before described in connection with Fig. 1. In this case the source of current selected will be that which will give the proper electro-motive force to pass the current through each of the pieces and of a sufficient volume necessary, on account of the resistance of these pieces, to cause heating at the joint and welding of two of the pieces or three of them, as desired. A Y-joint or a joint made at any angle may be accomplished readily in this manner. In this case, as in the other, the adjustments are made as any skilled electrician would make them to secure an electro-motive force depending on the resistance of the circuit in each case, so as to bring the temperature of the pieces gradually to the desired point.

In Fig. 3 the pieces P and A are held in suitable clamps C C², approaching toward each other at an angle, and the clamps C C² are made movable toward the apex of the angle, while a source of current of suitable character (symbolized at S) is arranged for feeding current to the pieces so held. The movement of the clamps toward the apex of the angle unites the pieces after they have been heated by the current. It is sometimes useful to apply in this case a frame or abutment at or near the angle shown at M, which may be made stationary or which may be slightly moved to assist the union of the metal at the extreme ends. The pieces may be chamfered or cut to meet at the angle before welding, although it would be sufficient to have one of them meet the other at the side, as shown in dotted line—that is, each piece could be cut off square or nearly square at the ends and one project a little beyond the other, as P, while the piece A meets it on the side, the juncture being in the line of the dots.

In Fig. 4 the application of the invention to the production of bodies for use in carriage-hardware and the like is shown, where a piece P, heavy in mass and provided with two projections at J J', has applied to it at these places and at nearly right angles to its length other similar pieces or pieces of similar section A B, held in proper clamps C² C³, a motion of which may be made toward P or a motion of P may be made toward A B when the heating of pieces has been properly done. The heavy clamp C serves to hold the piece P, and this clamp may be made movable, or when the other clamps C² C³ are movable the clamp C may be stationary. The arrangements for the supply of the current to the pieces between the clamps are to be made on the same principles as set forth in connection with Figs. 1 and 2, the object being to traverse the larger piece by larger volumes of current than the smaller pieces, whereby the heating operation in each goes on proportionately.

Having thus described my invention, what I claim is—

1. The herein-described improvement in welding metals electrically, consisting in making contact with both pieces to be united and passing a current of greater strength through one piece than through the other.

2. The herein-described improvement in welding together electrically pieces of metal of different conductivity, consisting in making contact with both pieces to be united and passing a current of greater strength through the piece having the least resistance than through the other.

3. The herein-described improvement in welding together pieces of metal of different conductivity, consisting in making contact with both pieces to be united, passing currents through both pieces, and proportioning the strength of the currents to the conductivity of the pieces to produce the same welding temperature in both pieces simultaneously.

4. The method of manufacturing angle-joints of pieces of metal, consisting in clamping the pieces to be welded together at the desired angle to each other, passing a current through the said pieces until they are sufficiently softened, and then pressing the pieces together to unite them while maintaining them at the angle at which they were clamped.

5. The method of making joints between pieces of metal, consisting in clamping the pieces to be welded at any desired angle or position with respect to each other, passing a current through each of the said pieces until they are sufficiently softened, proportioning the strength of the current to the conductivity of the pieces, and pressing the pieces together to unite them while maintaining them in the relative position or direction of angle in which they were clamped.

6. The method of welding, consisting in putting together two or more pieces of metal in contact, passing an electric current through the meeting-point or joint between the two pieces, and passing in addition, a branch current or separate current through the larger of the pieces and not through the smaller, so as to add to the heating effect in the larger piece, while leaving the heating in the smaller unaffected.

7. The method of electric welding, which consists in placing pieces together for union by electric heat and pressure and in combining the currents passing through the smaller pieces and through the joint to traverse summatively the larger piece or pieces, and thereby increase the heating effect in the larger piece to the amount required to complete the joint.

Signed at Lynn, county of Essex, and Commonwealth of Massachusetts, this 20th day of September, 1890.

ELIHU THOMSON.

Witnesses:
JOHN W. GIBBONEY,
E. W. RICE, Jr.